United States Patent [19]

Yamaji

[11] 4,338,098
[45] Jul. 6, 1982

[54] SOLID HEAT-GENERATING COMPOSITION

[75] Inventor: Teizo Yamaji, Yamaguchi, Japan

[73] Assignee: Teitin Limited, Osaka, Japan

[21] Appl. No.: 136,246

[22] Filed: Apr. 1, 1980

[30] Foreign Application Priority Data

| Apr. 3, 1979 | [JP] | Japan | 54-39324 |
| May 2, 1979 | [JP] | Japan | 54-53349 |
| May 2, 1979 | [JP] | Japan | 54-53350 |
| Jun. 13, 1979 | [JP] | Japan | 54-73480 |

[51] Int. Cl.$^3$ .................. F41C 7/00; F41C 11/00; F24J 1/00; A61F 7/00
[52] U.S. Cl. .................. 44/3 A; 44/3 C; 126/204; 126/263
[58] Field of Search .......... 44/3 R, 5 A, 3 B, 3 C; 126/263, 204

[56] References Cited

U.S. PATENT DOCUMENTS

| 1,901,313 | 3/1933 | Mann | 44/3 A |
| 2,080,085 | 5/1937 | May | 44/3 A |
| 3,301,250 | 1/1967 | Glasser | 44/3 R |
| 3,903,011 | 9/1975 | Donnelly | 44/3 R |
| 4,067,313 | 1/1978 | Donnelly | 126/263 |
| 4,095,583 | 6/1978 | Petersen et al. | 126/263 |
| 4,119,082 | 10/1978 | Miyamori et al. | 44/3 B |

FOREIGN PATENT DOCUMENTS

| 863212 | 3/1941 | France | 126/263 |
| 6919539 | 5/1971 | Netherlands | 126/263 |
| 679770 | 9/1952 | United Kingdom | 44/3 A |

*Primary Examiner*—Gary P. Straub
*Attorney, Agent, or Firm*—Sherman & Shalloway

[57] ABSTRACT

A solid heat-generating composition utilizing the heat of hydration of calcium oxide, comprising calcium oxide and a solid substance supplying water capable of reacting with calcium oxide such as a solid substance having water of absorption, adsorption or crystallization, and an organic compound which yields water by an intramolecular or intermolecular reaction at elevated temperature. The composition can be utilized in various applications utilizing heat generation, for example for thawing and heating frozen foods, controlled releasing of agricultural chemicals such as insecticides or repellents, warming human body, etc.

10 Claims, No Drawings

SOLID HEAT-GENERATING COMPOSITION

This invention relates to a solid heat-generating composition. More specifically, this invention relates to a solid heat-generating composition from which the heat of hydration of calcium oxide is taken out as utilizable heat.

Calcium oxide has been known to react with water to generate heat of hydration. It has long been considered rather dangerous to take out the heat of hydration of calcium oxide as positively utilizable heat because the amount of the heat generated is large. Recently, a method was reported for utilizing the large amount of this heat in volatilizing pyrethroid compounds (see Japanese Laid-Open Patent Publication No. 109,945). This method has the advantage that the amount of heat obtained is large, a high temperature can be obtained and by-products resulting from hydration are free from toxicity as compared with, for example, a heat-generating composition utilizing the amount of heat generated by the oxidation of a sulfide (Japanese Laid-Open Patent Publication No. 108,382), a heat-generating structure utilizing the heat generated by the oxidation of metallic iron (Japanese Laid-Open Patent Publication No. 40,477/75), etc. However, since this prior method relies on the reaction of calcium oxide with free liquid water, the amount of the free liquid water greatly affects the amount of heat generated. It is not always easy for the general consumers, for example, to adjust the amount of free liquid water to a proper one, and the amount of water used frequently falls outside the suitable range. If the amount of water is smaller than the limit, calcium oxide is not fully utilized and the amount of heat generated is insufficient. If the amount of water exceeds the suitable range, a part of the heat of hydration is consumed in heating or evaporating the excess of water, and the temperature does not rise correspondingly. Furthermore, since in the aforesaid method, calcium oxide is directly contacted with the free liquid water, temperature control is extremely difficult, and the reaction comes to an end within a short period of time and therefore the generation of heat comes to an end within a short period of time.

It is an object of this invention therefore to provide a solid heat-generating composition comprising calcium oxide and a solid substance supplying water capable of reacting with calcium oxide in which a hydration reaction of calcium oxide proceeds without supplying free liquid water.

Another object of this invention is to provide a solid, calcium oxide-containing, heat-generating composition whose hydration reaction is controlled and which, therefore, can keep generating heat over a long period of time.

Still another object of this invention is to provide a solid, calcium oxide-containing, heat-generating composition whose maximum attainable temperature is controlled, and which, therefore, can maintain a certain fixed maximum temperature over a long period of time.

Yet another object of this invention is to provide a solid, calcium oxide-containing, heat-generating composition in which the hydration of calcium oxide takes place at ambient temperature, and therefore, the heat of hydration cn be taken out at ambient temperature.

A further object of this invention is to provide a solid, calcium oxide-containing, heat-generating composition in which the hydration of calcium oxide does not take place at ambient temperature and which, therefore, is easy to handle at ambient temperature, and in which the hydration of calcium oxide takes place for the first time at an elevated temperature.

These and other objects and advantages of the invention will become apparent from the following description.

According to the broadest concept of this invention, these objects and advantages of the invention are achieved by a solid heat-generating composition utilizing the heat of hydration of calcium oxide, said composition comprising calcium oxide and a solid substance supplying water capable of reacting with calcium oxide.

The heat-generating composition is solid as a whole, and comprises calcium oxide and a solid substance which supplies water capable of reacting with calcium oxide. The composition contains enough water required for the hydration of calcium oxide without the need to supply water externally.

The solid heat-generating composition of this invention is described in detail below.

CALCIUM OXIDE

The composition of this invention gives heat of hydration as a result of the reaction of calcium oxide with water. Calcium oxide used in the composition of this invention, therefore, may contain other substances in such amounts as will not substantially hamper the hydration of calcium oxide with water.

Such calcium oxide may be of any commercially available industrial grades or reagent grades. These grades are generally produced by calcining calcium carbonate or by firing calcium hydroxide.

Calcium oxide can be used in the form of lump, granules, pellets, or powder. It is important that calcium oxide in these forms should have a moderately high surface area. Preferably, calcium oxide used has a particle size of granule or powder, and particularly, a particle size larger than about 100 Tyler's mesh, preferably 100 to 2 Tyler's mesh, above all 30 to 3 Tyler's mesh. By using calcium oxide in a form having the particle size of a granule or powder, it is easily mixed with the solid substance supplying water capable of reacting with calcium oxide, and therefore, the hydration reaction proceeds smoothly.

SOLID SUBSTANCE SUPPLYING WATER CAPABLE OF REACTING WITH CALCIUM OXIDE

The solid substance in the composition of this invention supplies water capable of reacting with calcium oxide. Accordingly, the water capable of reacting with calcium oxide is retained in some form in the solid substance in the composition of this invention, and does not exist in a freely flowable state. For example, the water exists as physically or chemically bound water in the solid substance. The bound water exists as water absorbed by the solid substance, water absorbed to the solid substance, water of crystallization of the solid substance, etc.

The composition of this invention is characterized by the fact that it contains water retained in the solid substance in the aforesaid state, in other words it contains water in a non-flowable state. No characteristic feature exists in the state of water retained in the solid substance or in the type of the solid substance.

Because the water retained in the solid substance in the composition of this invention is not freely flowable, it does not react with calcium oxide without control, but is gradually separated from the solid substance and supplied to calcium oxide, and therefore the rate of reaction is controlled according to the ability of the solid substance to hold water therein.

Specific examples of the solid substance supplying water capable of reacting with calcium oxide in this invention are given below.

(1) Solid substances having water of crystallization

Inorganic compounds having water of crystallization and solid organic compounds having water of crystallization can both be used.

Mineral acid salts, oxides or hydroxides of metals are preferred as the inorganic compounds having water of crystallization. The metals are, for example, metals positioned in the second to sixth periods of Groups I to VIII of the periodic table. Examples include metals of Group I such as Li, Na, K, Cu, Rb, and Cs; metals of Group II such as Mg, Ca, Zn, Sr and Ba; metals of Group III such as B and Al; metals of Group IV such as Si, Ti, Sn and Pb; metals of Group V such as V, Nb, Sb and Bi; metals of Group VI such as Cr, Mo and W; metals of Group VII such as Mn; and metals of Group VIII such as Fe, Co and Ni.

As the metals of the mineral acid salts, metals of Groups I, II, III, VII and VIII of the periodic table are preferred, and as the metals of the oxides or hydroxides, metals of Groups II to VI (excluding calcium oxide) are preferred.

Preferred mineral acid salts are, for example, chlorides, nitrates, phosphates, phosphites, sulfates, carbonates, bromides, borates, and silicates. The chlorides, sulfates, nitrates, phosphates and carbonates are especially preferred.

Specific examples of the inorganic compounds having water of crystallization include the following.

(a) Chlorides or bromides such as $FeCl_2.4H_2O$, $NiCl_2.6H_2O$, $CaCl_2.6H_2O$, $FeCl_3.6H_2O$, $MgCl_2.6H_2O$, $CoBr_2.6H_2O$ and $MnCl_2.4H_2O$; sulfates such as $MnSO_4.4-6H_2O$, $Na_2SO_4.10H_2O$, $Al_2(SO_4)_3.16-18H_2O$ and $NaHSO_4.H_2O$; nitrates such as $Cu(NO_3)_2.3H_2O$, $Mg(NO_3)_2.6H_2O$, $Al(NO_3)_3.9H_2O$, $Ni(NO_3)_2.6H_2O$, $Co(NO_3)_2.6H_2O$ and $Fe(NO_3)_3.(H_2O)$; phosphates such as $Na_2HPO_4.12H_2O$; carbonates such as $Na_2CO_3.10H_2O$; and oxides such as $SiO_2.H_2O$, $MoO_3.2H_2O$ and $WO_2.H_2O$.

(b) Sulfates such as $ZnSO_4.7H_2O$; nitrates such as $Zn(NO_3)_2.6H_2O$ and $Ca(NO_3)_2.4H_2O$; phosphites or phosphates such as $Na_2HPO_3.5H_2O$, $NaH_2PO_4.2H_2O$ and $Na_3PO_4.12H_2O$; silicates such as $Na_2SiO_3.9H_2O$; and borates such as $NaBO_3.4H_2O$.

(c) Chlorides such as $CuCl_2.2H_2O$; sulfates such as $CuSO_4.5H_2O$, $FeSO_4.9H_2O$, $Na_2S_2O_3.5H_2O$, $MgSO_4.7H_2O$, $FeSO_4.7H_2O$, $CoSO_4.7H_2O$ and $NiSO_4.6H_2O$; phosphates such as $Na_4P_2O_7.10H_2O$; carbonates such as $Na_2CO_3.H_2O$; borates such as $Na_2B_4O_7.10H_2O$; and hydroxides such as $Ba(OH)_2.8H_2O$ and $Sr(OH)_2.8H_2O$.

Specific examples of the organic compounds having water of crystallization include the following.

(a′) Organic sulfonic acids such as p-toluenesulfonic acid ($CH_3-C_6H_4-SO_3H.H_2O$).

(b′) Organic carboxylic acids such as oxalic acid (($COOH)_2.2H_2O$).

(c′) Organic carboxylic acids such as tartronic acid [$HOCH(COOH)_2.\frac{1}{2}H_2O$].

Investigations of the present inventors have shown that when mixed intimately with calcium oxide, the compounds in the groups (a) and (a′) give compositions which generate heat at ambient temperature, the compounds of the groups (b) and (b′) give compositions which do not generate heat at ambient temperature but generate heat when heated at 60° C., and the compounds in the groups (c) and (c′) do not generate heat when heated at 60° C. but generate heat when heated to a higher temperature.

Accordingly, the solid heat-generating composition of this invention may be adapted to generate heat at ambient temperature or at an elevated temperature by properly selecting the solid substance having water of crystallization.

(2) Solid substances having water of absorption or adsorption

The solid substances having water of absorption or adsorption differ from compounds containing water as water of crystallization, and denote solid substances which hold water in a discontinuous state distinguishable clearly from the matrix formed by the solid substances, i.e. in the absorbed or adsorbed state. Accordingly, these solid substances hold water in a nonflowable state, i.e. in a state of holding it by some physical or chemical affinity.

Such solid substances are organic or inorganic materials having water absorbed or adsorbed, preferably porous inorganic or organic materials, especially preferably porous inorganic or organic materials most preferably porous inorganic materials which do not decompose by the heat of hydration in the composition of this invention containing calcium oxide or even when decomposed by the heat of hydration, do not substantially generate by-products other than water.

Specific examples are molecular sieves having water absorbed or adsorbed therein or thereto.

Since the water so held by the solid substance reacts relatively easily with calcium oxide in the composition of this invention, compositions of this invention containing these solid substances having water of absorption or adsorption have the property of generating heat at ambient temperature.

(3) Solid substances which induce a reaction to form water

Solid substances which do not contain water but induce a reaction of forming water in the composition of this invention thereby supplying water for reaction with calcium oxide can also be used as the solid substance in the present invention.

The reaction induced by such solid substances may be an intramolecular or intermolecular reaction. For example, an exterification reaction takes place in the composition of this invention between a solid substance such as oxalic acid and a solid substance such as sorbitol. Or a dehydration reaction of tetrachlorophthalic acid($C_6Cl_4(COOH)_2$) having no water of crystallization is carried out in the composition of this invention.

Generally, such a water-yielding reaction does not easily occur at ambient temperature, but takes place at an elevated temperature. Accordingly, the composition of this invention containing such a solid substance yielding water by such a reaction generally produce heat at an elevated temperature.

The above-exemplified solid substances which supply water capable of reacting with calcium oxide in the solid heat-generating composition of this invention can be used in any form, such as lump, granules, pellets or powder.

Since it is water held by the solid substance, and not the solid substance itself, which reacts with calcium oxide in the composition of this invention, the hydration reaction does not take place only in a limited site where the solid substance comes into contact with calcium oxide. Accordingly, such solid substances can also be used in the various forms described above as is the case with calcium oxide.

In order to give an intimate mixture with calcium oxide in the composition, these solid substances are used desirably as granules or powders having a particle size smaller than 10 Tyler's mesh, preferably smaller than 20 Tyler's mesh, above all smaller than 30 Tyler's mesh, on an average.

SOLID HEAT-GENERATING COMPOSITION

In the broadest concept, the composition of this invention comprises calcium oxide of the grade described above and a solid substance supplying water capable of reacting with calcium oxide.

The ratio between calcium oxide and the solid substance in the composition of this invention is such that water held by the solid substance reacts with calcium oxide to give the desired amount of heat to the composition of this invention.

If the solid substance is used in a proportion which can supply water in an amount much smaller than the stoichiometrical amount which induces a hydration reaction with calcium oxide, the hydration reaction generally becomes difficult, the amount of heat obtained is small, and the ratio of utilization of calcium oxide is low.

On the other hand, when the solid substance is used in a proportion which supply water in an amount much larger than the stoichiometrical amount required to induce a hydration with calcium oxide, the ratio of utilization of the solid substance is generally low, and the temperature that can be reached is too low.

Investigations of the present inventors have shown that a composition in accordance with this invention which gives the desired heat can be obtained by using the solid substance in such an amount that the amount of water capable of performing a hydration reaction with calcium oxide is 0.01 to 100 moles, preferably 0.05 to 50 moles, especially preferably 0.1 to 30 moles, per mole of calcium oxide.

The heat-generating composition of this invention induces a hydration reaction between calcium oxide and water or is in condition for inducing such a reaction by intimately mixing calcium oxide with the solid substance supplying water capable of reacting with calcium oxide. In other words, depending upon the properties of the solid substance used, the present invention provides a heat-generating composition which induces the hydration reaction at ambient temperature and generates heat, or a heat-generating composition which does not induce the hydration reaction at ambient temperature but generates heat at an elevated temperature.

The heat-generating composition of this invention which generates heat upon inducing the hydration reaction at ambient temperature, for example, comprises (1) calcium oxide and at least one compound selected from the group consisting of compounds having water of crystallization classified under (a) and (a') above and solid substances having water of absorption or adsorption or (2) in addition to the composition (1), at least one additional compound selected from the group consisting of compounds having water of crystallization classified under (b), (c), (b') and (c') above and solid substances forming water upon reaction.

The heat-generating composition of this invention having the constituents (2) above shows the property of generating heat at ambient temperature presumably because the heat of hydration generated by the hydration reaction of calcium oxide with the compound (a) or (a') having water of crystallization which induces a hydration reaction with calcium oxide at ambient temperature or the compound having water of absorption or adsorption initiates the reaction of calcium oxide with the solid substance which induces a hydration reaction at an elevated temperature (e.g., the compound (b), (c), (b') or (c')).

The heat-generating composition of this invention which generates heat for the first time at an elevated temperature, for example, comprises (3) calcium oxide and at least one compound selected from the group consisting of the compound having water of crystallization classified under (b), (c), (b'), and (c') above and the solid substances generating water upon reaction.

Such a composition of this invention can be prepared as a composition which begins heat generation at an elevated temperature by properly selecting the solid substance used. The composition therefore requires an elevated temperature for the initiation of the hydration reaction. Once the hydration reactions begins, it continues by the generated heat of hydration. Hence, after the hydration reaction has started, heat can be generated even if the composition is placed in an atmosphere kept at ambient temperature.

This type of the composition of this invention which begins hydration at an elevated temperature has the advantage of being easily handled because it can be held at ambient temperature.

Thus, the solid heat-generating composition of this invention shows the excellent property of inducing the hydration reaction between calcium oxide and water under spontaneously controlled conditions according to the properties of the solid substance which supplies water capable of reacting with calcium oxide.

Investigations of the present inventors have also shown that there can be provided a heat-generating composition from which a constant temperature can be continuously taken out by including into the above composition an inert solid substance (temperature controlling agent) which absorbs a part of the heat of hydration between calcium oxide and water and melts. According to this composition, a part of the heat of hydration between calcium oxide and water is absorbed by the inert solid substance and thereby the inert solid substance melts. Accordingly, until all of the inert solid substance melts substantially, a temperature below the melting point but close to it can be continuously taken out. Thus, such a composition of this invention can be used to heat an object which is desired to be heated at a nearly constant temperature, for example warming of the human body. It further has the advantage that since the heat of hydration is stored as the heat of melting, the object can be heated over a longer period of time.

The inert solid substance capable of melting is not substantially reactive with calcium oxide and the solid substance supplying water capable of reacting with calcium oxide. It is an organic compound having a melting point of preferably 40° to 300° C., more preferably 60° to 250° C. For example, it includes hydrocarbons, esters, ethers, and ketones. Specific examples of these compounds are given below. The parenthesized numbers show the melting points of the respective compounds.

Hydrocarbons

Trans-stilbene (124), chrysene (255), anthracene (216), 9,10-dihydroanthracene (108), 1-methylanthracene (86), diphenyl (70.5), 4,4'-dimethyldiphenyl (125), naphthalene (80), 2,3-dimethylnaphthalene (104), 2,6-dimethylnaphthalene (110), 2,7-dimethylnaphthalene (96), di-α-naphthylmethane (109), and acenaphthene (95).

Esters

Phenyl benzoate (70), dimethyl isophthalate (71), dimethyl terephthalate (141), and acetyl-4-biphenyl (88).

Ethers

Methyl-β-naphthyl ether (75).

Ketones

Dimethylbenzophenone (98), and dichloroacetone (42).

The inert solid compound can be included in the form of lump, granules, powder, pellets, etc. in the composition of this invention. Preferably, it is included in the form of granules or powder having a particle size smaller than 10 Tyler's mesh, preferably smaller than 20 Tyler's mesh, above all smaller than 30 Tyler's mesh.

The suitable amount of the inert solid compound can be varied depending upon the heat-generating pattern required of the composition of this invention, i.e. whether a nearly constant temperature is kept until the hydration reaction of calcium oxide ends, or whether a constant temperature is maintained for a certain period of time and then a higher temperature is given. By performing experiments according to the required heat-generating characteristics, those skilled in the art can easily determine the suitable amount of the inert solid substance. Generally, the inert solid compound is used in an amount 1/5 to 5 times, preferably ¼ to 4 times, especially preferably ⅓ to 3 times, the weight of calcium oxide.

The heat-generating composition of this invention, which comprises calcium oxide, the solid substance supplying water capable of reacting with calcium oxide and optionally the inert melting solid substance for controlling the heat-generating temperature to a constant point, may further include an inert filler.

The inert filler is solid at ambient temperature, and preferably is always solid in the composition which is in the process of generating heat. The filler does not participate as a reagent in the hydration reaction between calcium oxide and water, and is used, for example, to assist in warming, reaction or dispersion of heat, or to improve mixing of the individual ingredients of the composition. For example, diaspore has one molecule of water as is seen from its formula $Al_2O_3 \cdot H_2O$. As is well known, this water of crystallization is liberated for the first time at a temperature of about 550° C. Accordingly, when the maximum heat-generating temperature of the composition of this invention is lower than 550° C., diaspore can be used as the inert filler in the composition of this invention. The inert filler may be inorganic or organic so long as it has this property. Preferred inert fillers are sparingly water soluble or water-insoluble.

Specific examples of the inert filler include synthetic silica and alumina type oxides such as silica, α, β or γ-alumina, silica alumina ($SiO_2/Al_2O_3$ weight ratio = 1/99 to 99/1); natural silica-type minerals such as silica rock, silica sand, powdery quartz and diatomaceous earth; natural alumina-type minerals such as bauxite, bohemite, diaspore, gibbsite, bayerite, alum shale, and clay; natural silica alumina type minerals including various zeolites and montmorillonite, such as feldspar, kaolin, kibushi clay, bentonite, acid clay, pyrophillite, cerite, mica (e.g., muscovite), nacrite, and alumina silicates; molecular sieves such as molecular sieves 3A, 5A and 10A;i natural silica magnesia type minerals such as talc, olivine, India mica asbestos, and serpentine; synthetic silica magnesia (the $SiO_2/MgO$ weight ratio = 1/99 to 99/1); and other materials such as activated carbon, calcium sulfate, calcium silicate, natural graphite, silica-zirconia, aluminum hydroxide and iron oxide, and microcrystalline cellulose.

The amount of the inert filler is 0.01 to 100 parts by weight, preferably 0.05 to 50 parts by weight, especially preferably 0.1 to 20 parts by weight, per part by weight of calcium oxide. The inert filler can be used in the same size as the solid substance described hereinabove. The inert filler is selected, and its amount determined, according to a property to be imparted to the composition of this invention.

The solid heat-generating composition of this invention consists essentially of calcium oxide and a solid substance supplying water capable of reacting with calcium oxide, and optionally the melting solid substance and/or the inert filler as additional ingredients.

By intimately mixing the individual ingredients in predetermined amounts, the hydration reaction of calcium oxide takes place to generate heat that can be taken out. According to this invention, there is provided with much simplicity a solid heat-generating composition which can generate heat in such an amount as to bring the inside temperature of the composition to 80° to 350° C. when its constituents are mixed within a thermally insulative bottle.

In an ordinary form of packing, calcium and the solid substance supplying water capable of reacting with calcium oxide are placed physically separated and out of contact with each other in the composition of this invention. In use, this non-contacting state is destroyed, and the two ingredients are intimately mixed to initiate heat generation. For example, the two ingredients are separately placed in two mechanically partitioned portions, and in use, the mechanical partition is removed to mix the two ingredients. Or the two ingredients may be placed in separate bags, and in use the bags are opened to mix the two ingredients.

When the solid substance used in the composition of this invention does not cause a hydration reaction with calcium oxide at ambient temperature but does so only at an elevated temperature, calcium oxide and the solid substance may also be stored in contact with each other, and at times in an intimately mixed state. This form of packing can be taken because calcium oxide does not induce hydration at ambient temperature. To initiate the hydration reaction, the composition in the intimately mixed state is externally heated to bring the temperature of at least a part of the composition to a sufficiently elevated temperature for initiation of the reaction. Heat-generation then continues.

When the composition comprising the solid substance which initiates hydration reaction with calcium oxide at ambient temperature further includes a solid substance which initiates hydration reaction with calcium oxide only at an elevated temperature, such a solid substance may be packed together with calcium oxide or with the solid substance which initiates hydration reaction at ambient temperature.

In the ordinary packed form, the melting solid substance and the inert filler may also be packed together with any of the essential ingredients.

By utilizing the ability of generated heat, the composition of this invention can be utilized in various applications utilizing heat generation, for example for thawing and heating frozen foods, controlled releasing of agricultural chemicals such as insecticides or repellents, warming human body, etc.

The following Examples illustrate the present invention more specifically.

EXAMPLES 1 TO 36

Powder of calcium oxide (30 Tyler's mesh) was put into a thermally insulative bottle with a broad neck having an inside diameter of 70 mm and a depth of 130 mm, and then mixed well at room temperature with a powder 30–60 Tyler's mesh) of each of the various solid substances shown in Table 1. A thermometer was inserted in the mixed powder, and a rise in temperature was recorded. The results are shown in Table 1.

The amount of calcium oxide used and the types and amounts of the solid substances are shown in Table 1.

In some of these Examples, powdery fillers (30–80 Tyler's mesh) were added also to the mixed powder. The types and amounts of these fillers are also shown in Table 1.

TABLE 1

| Example | Calcium oxide (g) | Solid substance (g) | | Filler (g) | | Time elapsed (min) | Temperature attained (°C.) | Time elapsed (min) | Temperature attained (°C.) |
|---|---|---|---|---|---|---|---|---|---|
| 1 | 28 | Na$_2$SO$_4$ . 10H$_2$O | (16) | — | | 5 | 210 | 68 | 88 |
| 2 | 10 | " | (4.0) | — | | 5 | 40 | 60 | 74 |
| 3 | 10 | " | (40) | — | | 5 | 51 | 60 | 34 |
| 4 | 33 | Na$_2$CO$_3$ . 10H$_2$O | (17) | — | | 20 | 230 | 60 | 115 |
| 5 | 44.3 | SiO$_2$ . 2H$_2$O | (6.7) | — | | 5 | 190 | 60 | 40 |
| 6 | 40 | SiO$_2$ . H$_2$O | (10) | — | | 5 | 220 | 60 | 70 |
| 7 | 46.7 | " | (3.3) | — | | 5 | 64 | 60 | 39 |
| 8 | 80 | " | (20) | — | | 5 | 280 | 10 | 300 |
| 9 | 40 | " | (10) | Wood flour (10) | | 5 | 170 | 60 | 100 |
| 10 | 40 | " | (10) | Diatomaceous earth (10) | | 5 | 180 | 60 | 105 |
| 11 | 40 | " | (10) | Activated carbon (10) | | 5 | 40 | 30 | 150 |
| | | | | | | | | 60 | 105 |
| 12 | 40 | " | (10) | Silicon-alumina (10) | | 5 | 140 | 60 | 70 |
| 13 | 40 | " | (10) | alumina (10) | | 5 | 60 | 60 | 90 |
| 14 | 40 | Na$_2$HPO$_4$ . 12H$_2$O | (10) | — | | 5 | 231 | 16 | 100 |
| 15 | 25 | MnSO$_4$ . 6H$_2$O | (25) | — | | 6 | 228 | 30 | 80 |
| 16 | 25 | MoO$_3$ . 2H$_2$O | (25) | — | | 4 | 123 | 30 | 45 |
| 17 | 40 | Al$_2$(SO$_4$)$_3$ . 18H$_2$O | (10) | — | | 5 | 105 | 20 | 75 |
| 18 | 40 | " | (20) | Wood flour (10) | | 25 | 50 | 45 | 49 |
| 19 | 40 | " | (20) | Diatomaceous earth (10) | | 30 | 181 | 50 | 140 |
| 20 | 40 | Na$_2$HPO$_4$ . 12H$_2$O | (10) | Wood flour (10) | | 60 | 370 | 70 | 340 |
| 21 | 40 | " | (10) | Diatomaceous earth (10) | | 13 | 218 | 30 | 165 |
| 22 | 40 | " | (10) | Activated carbon (10) | | 30 | 281 | 41 | 254 |
| 23 | 40 | Co(NO$_3$)$_2$ . 6H$_2$O | (10) | — | | 2 | 157 | 10 | 97 |
| 24 | 25 | Cu(NO$_3$)$_2$ . 3H$_2$O | (25) | — | | 4 | 186 | 15 | 100 |
| 25 | 40 | Ni(NO$_3$)$_2$ . 6H$_2$O | (10) | — | | 3 | 115 | 18 | 68 |
| 26 | 40 | Mg(NO$_3$)$_2$ . 6H$_2$O | (10) | — | | 8 | 148 | 18 | 70 |
| 27 | 40 | MgCl$_2$ . 6H$_2$O | (10) | — | | 2 | 150 | 20 | 50 |
| 28 | 40 | CaCl$_2$ . 6H$_2$O | (10) | — | | 3 | 161 | 25 | 60 |
| 29 | 40 | Fe(NO$_3$)$_2$ . 9H$_2$O | (10) | — | | 1 | 170 | 10 | 110 |
| 30 | 40 | MnCl$_2$ . 4H$_2$O | (10) | — | | 3 | 166 | 20 | 67 |
| 31 | 40 | NiCl$_2$ . 6H$_2$O | (10) | — | | 5 | 162 | 25 | 60 |
| 32 | 40 | " | (10) | Wood flour (10) | | 23 | 130 | 32 | 103 |
| 33 | 40 | " | (10) | Diatomaceous earth (10) | | 43 | 116 | 50 | 103 |
| 34 | 40 | " | (10) | Activated carbon (10) | | 8 | 61 | 15 | 59 |
| 34 | 40 | Al(NO$_3$)$_3$ . 9H$_2$O | (10) | — | | 2 | 180 | 30 | 53 |
| 36 | 40 | " | (10) | Wood flour (10) | | 17 | 147 | 30 | 131 |
| 37 | 40 | " | (10) | Diatomaceous earth (10) | | 15 | 173 | 30 | 131 |
| 38 | 40 | " | (10) | Activated | | 17 | 150 | 30 | 110 |

TABLE 1-continued

| Example | Calcium oxide (g) | Solid substance (g) | Filler (g) | Results of heat generation | | | |
|---|---|---|---|---|---|---|---|
| | | | | Time elapsed (min) | Temperature attained (°C.) | Time elapsed (min) | Temperature attained (°C.) |
| | | | carbon (10) | | | | |

EXAMPLES 37 TO 44

Powder of calcium oxide (30 Tyler's mesh) was put into a thermally insulative bottle with a broad neck having an inside diameter of 70 mm and a depth of 130 mm, and then each of the solid substances (30–60 Tyler's mesh) and each of the temperature con rol agents (ca. 30 mesh) in powder form indicated in Table 2 were added. They were well mixed at room temperature. A thermometer was inserted in the mixed powder, and a rise in temperature was recorded. The results are shown in Table 2. The types and amounts of the solid substances and the temperature controlling agents and the amount of calcium oxide are shown in Table 2.

In some of the Examples, powdery fillers (30–80 Tyler's mesh) were also added. The types and amounts of the fillers are also shown in Table 2.

TABLE 2

| Example | Calcium oxide (g) | Solid substance (g) | Filler (g) | Temperature controlling agent (g) | |
|---|---|---|---|---|---|
| 37 | 80 | meta-silicic acid | (40) — | Dimethyl terephthalate | (80) |
| 38 | 80 | meta-silicic acid | (40) — | Dimethyl terephthalate | (120) |
| 39 | 60 | $MoO_3 \cdot 2H_2O$ | (60) — | Diphenyl | (80) |
| 40 | 60 | $Na_2HPO_4 \cdot 12H_2O$ | (20) — | Diphenyl | (80) |
| 41 | 80 | $Na_2SO_4 \cdot 10H_2O$ | (30) — | Diphenyl | (80) |
| 42 | 80 | meta-silicic acid | (40) — | Dimethyl diphenyl | (80) |
| 43 | 60 | $Na_2SO_4 \cdot 10H_2O$ | (20) Diatomeceous earth (20) | Diphenyl | (80) |
| 44 | 60 | $Na_2SO_4 \cdot 10H_2O$ | (20) Silica-alumina (20) | Diphenyl | (80) |

| | Results of heat-generation | | | | | |
|---|---|---|---|---|---|---|
| Example | Time elapsed (min.) | Temperature attained (°C.) | Time elasped (min.) | Temperature attained (°C.) | Time elapsed (min.) | Temperature attained (°C.) |
| 37 | 40 | 145 | 100 | 140 | 150 | 140 |
| 38 | 40 | 100 | 100 | 140 | 150 | 135 |
| 39 | 10 | 70 | 100 | 70 | 180 | 65 |
| 40 | 120 | 70 | 180 | 70 | | |
| 41 | 110 | 78 | 200 | 70 | | |
| 42 | 60 | 125 | 150 | 125 | | |
| 43 | 130 | 79 | 230 | 70 | | |
| 44 | 120 | 70 | 230 | 70 | | |

EXAMPLES 45 TO 65

A beaker having an inside diameter of 60 mm and a depth of 130 mm was put into a silicone oil bath, and 40 g of powder (20 Tyler's mesh) of calcium oxide was put into the beaker. Each of the solid substances (30–60 Tyler's mesh) shown in Table 3 was added and well mixed. A thermometer was inserted into the mixed powder, and a rise in temperature was recorded. The results are shown in Table 3. The types and amounts of the solid substances and the temperature of the bath are also shown in Table 3.

TABLE 3

| Example | Calcium oxide (g) | Solid substance (g) | | Bath temperature (°C.) | Results of heat-generation | |
|---|---|---|---|---|---|---|
| | | | | | Time elapsed (min.) | Temperature attained (°C.) |
| 45 | 40 | $Na_2SiO_3 \cdot 9H_2O$ | (10) | 60 | 12 | 235 |
| 46 | 40 | $NaBO_3 \cdot 4H_2O$ | (10) | 60 | 15 | 143 |
| 47 | 40 | $NaHSO_4 \cdot H_2O$ | (30) | 60 | 7 | 313 |
| 48 | 40 | $NaHSO_4 \cdot H_2O$ | (30) | 20 | 9 | 305 |
| 49 | 40 | $NaH_2PO_4 \cdot 2H_2O$ | (20) | 60 | 8 | 240 |
| 50 | 40 | $ZnSO_4 \cdot 7H_2O$ | (10) | 60 | 8 | 187 |
| 51 | 40 | $Na_2HPO_3 \cdot 5H_2O$ | (10) | 60 | 27 | 200 |
| 52 | 40 | $Co(CH_3COO)_2 \cdot 4H_2O$ | (10) | 80 | 8 | 130 |
| 53 | 40 | $Na_3PO_4 \cdot 12H_2O$ | (10) | 80 | 9 | 260 |
| 54 | 40 | $Zn(NO_3)_2 \cdot 6H_2O$ | (10) | 50 | 1 | 120 |
| 55 | 40 | $Zn(NO_3)_2 \cdot 6H_2O$ | (10) | 20 | 3 | 205 |
| 56 | 40 | $Na_2SiO_3 \cdot 9H_2O$ | (10) | 20 | 10 | 240 |

TABLE 3-continued

| Example | Calcium oxide (g) | Solid substance (g) | | Bath temperature (°C.) | Results of heat-generation | |
|---|---|---|---|---|---|---|
| | | | | | Time elapsed (min.) | Temperature attained (°C.) |
| | | SiO$_2$ . H$_2$O | (8) | | | |
| 57 | 40 | SiO$_2$ | (5) | 20 | 4 | 85 |
| 58 | 40 | CaSO$_4$ . 2H$_2$O | (20) | 130 | 13 | 212 |
| 59 | 40 | p-Toluene sulfonic acid monohydrate | (30) | 20 | 5 | 150 |
| 60 | 40 | p-Toluene sulfonic acid monohydrate | (30) | 50 | 3 | 153 |
| 61 | 40 | (COOH)$_2$ . 2H$_2$O | (20) | 80 | 25 | 196 |
| 62 | 40 | Gallic acid monohydrate | (20) | 80 | 37 | 106 |
| 63 | 40 | Hydrous molecular sieve powder (CaO:H$_2$O=1:0.389 mole ratio) | (35) | 20 | 30 | 113 |
| 64 | 40 | Hydrous molecular sieve pellets (CaO:H$_2$O=1:0.389 mole ratio) | (35) | 20 | 45 | 87 |
| 65 | 40 | Hydrous molecular sieve pellets (CaO:H$_2$O=1:0.389 mole ratio) | (40) | 20 | 9 | 192 |

What we claim is:

1. A self-contained solid two-component heat-generating chemical system packaged in a form ready for use to generate heat in the form of heat of hydration of calcium oxide by allowing said two-components to contact each other, the first of said two-components comprising granules or powder of calcium oxide, and the second of said two-components comprising granules or powder of a solid substance containing water of crystallization which substance supplies the water required for the hydration of calcium oxide exclusively of any externally supplied water, said ready for use package including at least one partition physically separating the calcium oxide from the solid substance to maintain the calcium oxide and the solid substance out of contact with each other until said at least one partition is removed just prior to use of said heat-generating chemical system.

2. The ready for use packaged solid heat-generating system of claim 1 wherein said solid substance is an organic carboxylic acid or organic sulfonic acid having water of crystallization.

3. The ready for use packaged solid heat-generating system of claim 1 wherein said solid substance is a mineral acid metal salt, a metal oxide or a metal hydroxide.

4. The ready for use packaged solid heat-generating system of claim 3 wherein said mineral acid metal salt is a metal halide, a metal sulfate, a metal nitrate, a metal phosphate or a metal carbonate.

5. The ready for use packaged solid heat-generating system of claim 1 which further comprises an inert solid substance which melts upon absorption of a part of the heat of hydration of calcium oxide.

6. The ready for use packaged solid heat-generating system of claims 1, or 5 wherein calcium oxide has a particle size larger than about 100 Tyler's mesh on an average.

7. The ready for use packaged solid heat-generating system of claims 1, or 5 wherein said solid substance has a particle size smaller than about 10 Tyler's mesh on an average.

8. The ready for use packaged solid heat-generating system of claim 1 wherein said solid substance is a solid substance which induces a hydration reaction with calcium oxide at ambient temperature upon contact therewith.

9. A method of generating heat in the form of heat of hydration of calcium oxide using the self-contained solid two-component heat generating chemical system of claim 1 which comprises removing said at least one partition and intimately mixing the granules or powder of calcium oxide and the solid substance to allow the water of the solid substance to hydrate the calcium oxide and thereby generate heat of hydration.

10. A self-contained solid two-component heat-generating chemical system packaged in a form ready for use to generate heat in the form of heat of hydration of calcium oxide by allowing said two-components to contact each other, the first of said two-components comprising granules or powder of calcium oxide, and the second of said two-components comprises a molecular sieve which supplies the water required for the hydration of calcium oxide exclusively of any externally supplied water, said ready for use package including at least one partition physically separating the calcium oxide from the solid substance to maintain the calcium oxide and the solid substance out of contact with each other until said at least one partition is removed just prior to use of said heat-generating chemical system.

* * * * *

UNITED STATES PATENT AND TRADEMARK OFFICE
CERTIFICATE OF CORRECTION

PATENT NO. : 4,338,098
DATED : July 6, 1982
INVENTOR(S) : TEIZO YAMAJI

It is certified that error appears in the above—identified patent and that said Letters Patent is hereby corrected as shown below:

On the title page assignee should read as follows:

-- Assignee: Teijin Limited, Osaka, Japan --

Signed and Sealed this

Ninth Day of November 1982

[SEAL]

Attest:

GERALD J. MOSSINGHOFF

Attesting Officer — Commissioner of Patents and Trademarks